(No Model.)

J. L. BROWN.
AIR MIXER FOR GAS.

No. 353,843. Patented Dec. 7, 1886.

WITNESSES
Thos. Houghton.
A. W. Bright

INVENTOR
James L. Brown,
per W. H. Singleton,
Attorney

UNITED STATES PATENT OFFICE.

JAMES L. BROWN, OF BROOKVILLE, PENNSYLVANIA.

AIR-MIXER FOR GAS.

SPECIFICATION forming part of Letters Patent No. 353,843, dated December 7, 1886.

Application filed February 18, 1886. Serial No. 192,380. (No model.)

*To all whom it may concern:*

Be it known that I, JAMES L. BROWN, a citizen of the United States, residing at Brookville, in the county of Jefferson and State of Pennsylvania, have invented certain new and useful Improvements in Gas and Air Mixers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
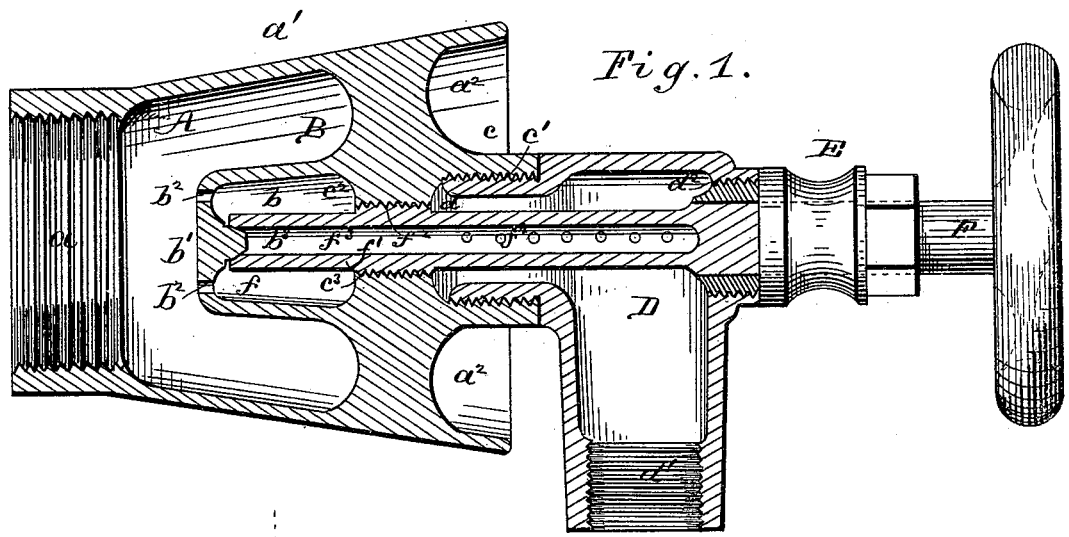
Figure 2:
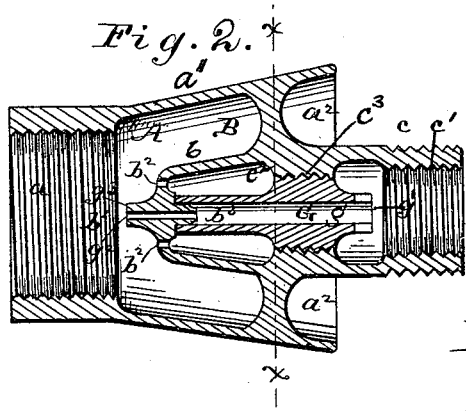
Figure 3:
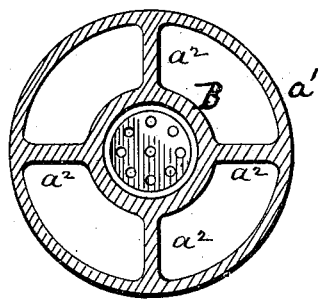

Figures 1 and 2 represent two kinds of gas and air mixers which contain my invention, being shown in longitudinal section; and Fig. 3 is a transverse section.

This invention relates to improvements in gas and air mixers, or those devices in which atmospheric air is united with gas before it reaches the place of incandescence. These devices are used with and specially adapted for what is known as "natural gas," but may be used with the manufactured gas.

In the annexed drawings, the letter A indicates a shell which is conoidal. At one end, $a$, it is cylindrical, and from this end the body $a'$ runs back conoidally, and at the greater end or base of the cone the shell is braced across by the four wings $a^2$, which connect the outer wall of the shell A with a hollow boss, B, which extends each side of the plane of the wings, and has a slight taper corresponding to that of the outer wall of the shell. The inner projecting part, $b$, of this boss is made with a solid wall, except at its end $b'$, where it is provided with a number of holes, $b^2$, preferably in a circle. On the inside this end is made with a valve-seat, $b^3$, within the circle of holes. The outer projecting part, $c$, of the boss B is open and internally threaded at $c'$. The bore of this boss is contracted at $c^2$ in the plane of the wings $a^2$, and at this point there are threads $c^3$. Engaging the threads $c'$ is the correspondingly-threaded tap $d$ of the connection D. This connection has the internally-threaded extension $d'$ at a right angle to the tap $d$, and the opening $d^2$ on a line with the tap $d$ and similarly threaded. Engaging the threads of the opening $d^2$ is a gland, E. Through this gland passes a valve-stem, F, the inner end, $f$, of said valve resting on the seat $b^3$. The valve-stem $f'$ is threaded at the point $f^2$, and such threads engage the threads $c^3$. This stem $f'$ is hollow, its bore $f^3$ being open at the end $f$ and closed at the other end. Openings $f^4$ lead into this bore.

As stated, this mixer is placed in position, the extension $d'$ connecting with the gas-supply pipe, and another pipe leads from the end $a$, suitable couplings engaging the threads at these points. When the valve is down on the seat $f$, the mixer is closed and there is no flow of gas. By operating the valve and lifting the stem from the seat the gas presses through the openings $f^4$, through the stem, and out through the holes $b^2$, and passes to the place of incandescence. In its onward progress it draws with it air around the boss B and among the wings $a^2$ in the well-known manner. Now the amount of flow of gas can be regulated by moving in and out the stem $f'$, and this is determined by the pressure of the gas. It will be seen that this device is therefore not only a mixer, but is a regulator, and with it no other valve is necessary. By arranging the holes $b^2$ in a circle the gas enters the mixing-chamber in a spray and not in a solid column; hence it becomes thoroughly commingled with the air, and the two, in a condition highly suitable for combustion, arrive at the place of incandescence. As the gas is burned, there is therefore little or no waste. The amount is easily adjusted, and whatever is allowed to pass is supplied with the due amount of air.

The holes $b^2$ are to be made in number so as to adapt the device for a maximum pressure, and less is obtained by manipulating the stem; hence this device can be used without any change, whatever the pressure.

This device is to be used where it is desirable to have a device which can be manipulated from the outside.

In Fig. 2 is the other form of mixer containing the invention. Here there is no connection D. The part $c$ is connected directly with the gas-supply pipe. The valve-stem is cut off in the boss, forming a short valve, G, having a continuous bore, $g$, and adapted at the end $g'$ to a wrench. The end $b'$ of the boss B has a central hole, $g^2$, and a nozzle, $g^3$, in the outside. This form is put in position like the other; but the valve G is to be adjusted before the mixer is put in place, and cannot be tampered with. In this form, even when the valve G is on the seat $b^3$, there will be a flow of gas; hence an ordinary valve is provided to be operated by the consumer for turning on and off the gas; but the use of this valve in no way affects the pressure, as that is regulated solely by the valve G.

I am aware that an air-mixer has been devised wherein the flow of air is regulated; also, that the ordinary stop-cock is used; also, that a Bunsen burner has been provided with a regulator placed in the gas-passage of such burner. I lay no broad claim to a mixer having a regulator in its gas-passage, but only to a mixer as improved by me, such improvements being set forth in my claims.

Having described my invention, what I claim is—

1. As an article of manufacture, a gas and air mixer consisting of a shell adapted for connection with the supply-pipe for gas and the gas-burner, and having a passage for air and another passage for gas, and provided with a regulator located within the said passage for gas, said regulator being wholly within the shell, whereby the regulator is only accessible when the mixer is disconnected from the supply-pipe, as set forth.

2. As an article of manufacture, a gas and air mixer consisting of a shell adapted for connection with the supply-pipe for gas and the gas-burner, said shell having a passage for air and another passage for gas, and the holes $b^2$, located as described, and provided with a regulator located within the passage for gas and controlling the holes $b^2$, as set forth.

3. A gas and air mixer having the holes $b^2$, arranged as described, and the central hole, $b'$, and provided with the gas-regulator G, having the continuous bore $g$, as set forth.

4. The combination of the conoidal shell A, having the hollow boss B and wings $a^2$, there being an air-passage at such wings and an opening for gas in such boss, with a regulator for gas, which is located within said boss and controls the opening for gas, as set forth.

5. A gas and air mixer consisting of a shell having a hollow boss within and connected to the shell by wings, at which is an opening for air, said boss having the holes $b^2$, with a regulator for gas within said boss and controlling the holes $b^2$, as set forth.

In testimony whereof I affix my signature in presence of two witnesses.

JAMES L. BROWN.

Witnesses:
W. H. SINGLETON,
H. A. HALL.